United States Patent
Herrala et al.

(10) Patent No.: US 9,648,662 B2
(45) Date of Patent: May 9, 2017

(54) BLUETOOTH NETWORKING

(75) Inventors: Sami Herrala, Oulu (FI); Jari Kylmänen, Kiviniemi (FI); Jaakko Niemi, Oulu (FI)

(73) Assignee: 9Solutions Oy, Oulu (FI)

( * ) Notice: Subject to any disclaimer, the term of this patent is extended or adjusted under 35 U.S.C. 154(b) by 23 days.

(21) Appl. No.: 13/167,395

(22) Filed: Jun. 23, 2011

(65) Prior Publication Data

US 2012/0057518 A1    Mar. 8, 2012

(30) Foreign Application Priority Data

Jun. 24, 2010  (EP) .................................. 10167109

(51) Int. Cl.
 H04B 7/14      (2006.01)
 H04W 84/20    (2009.01)
 H04W 88/04    (2009.01)

(52) U.S. Cl.
 CPC ............ *H04W 84/20* (2013.01); *H04W 88/04* (2013.01)

(58) Field of Classification Search
 CPC .............................. H04W 84/20; H04W 88/04
 USPC .......... 370/315, 329, 406, 466; 455/517, 41, 455/552.1
 See application file for complete search history.

(56) References Cited

U.S. PATENT DOCUMENTS

| | | | | |
|---|---|---|---|---|
| 6,278,723 B1 * | 8/2001 | Meihofer | ............... | H04B 1/715 375/131 |
| 6,754,250 B2 * | 6/2004 | Haartsen | ................ | H04B 1/713 375/132 |
| 6,834,192 B1 * | 12/2004 | Watanabe | ............. | H04W 36/00 370/331 |
| 6,968,153 B1 * | 11/2005 | Heinonen et al. | ........... | 455/11.1 |
| 7,613,425 B2 * | 11/2009 | Tailor | ........................... | 455/41.2 |
| 7,831,738 B2 * | 11/2010 | Rofougaran | .................. | 709/250 |
| 2001/0010689 A1 * | 8/2001 | Awater et al. | ................ | 370/344 |
| 2002/0012381 A1 * | 1/2002 | Mattisson | ............. | H04B 1/005 375/132 |
| 2002/0037716 A1 * | 3/2002 | McKenna | ............. | H04W 40/02 455/426.1 |
| 2002/0044549 A1 * | 4/2002 | Johansson et al. | ........... | 370/386 |
| 2002/0075940 A1 * | 6/2002 | Haartsen | ................ | H04B 1/713 375/132 |
| 2003/0002504 A1 * | 1/2003 | Forstadius | ............. | H04L 29/06 370/392 |
| 2003/0060222 A1 * | 3/2003 | Rune | ..................... | H04W 8/005 455/517 |

(Continued)

FOREIGN PATENT DOCUMENTS

| | | |
|---|---|---|
| EP | 1542377 A2 | 6/2005 |
| WO | 02/054790 A2 | 7/2002 |
| WO | 03/067954 A2 | 8/2003 |

*Primary Examiner* — Khaled Kassim
*Assistant Examiner* — Berhanu Belete
(74) *Attorney, Agent, or Firm* — Sughrue Mion, PLLC

(57) ABSTRACT

An apparatus enabling establishment of a Bluetooth mesh network comprises at least two Bluetooth transceiver circuitries and an internal connection between the at least two Bluetooth transceiver circuitries. The Bluetooth transceiver circuitries are simultaneously connected to different Bluetooth piconets, and the apparatus operates as a bridge between the piconets. Concatenation of such apparatuses enables construction of a Bluetooth mesh network where the bridge devices may be simultaneously connected to multiple Bluetooth piconets.

16 Claims, 3 Drawing Sheets

(56) References Cited

U.S. PATENT DOCUMENTS

| | | | |
|---|---|---|---|
| 2004/0097263 A1* | 5/2004 | Katayama et al. | 455/556.1 |
| 2004/0136338 A1* | 7/2004 | Lin et al. | 370/329 |
| 2004/0156318 A1* | 8/2004 | Rune | H04W 92/02 370/235 |
| 2004/0160986 A1* | 8/2004 | Perlman | 370/480 |
| 2004/0162106 A1* | 8/2004 | Monroe et al. | 455/552.1 |
| 2004/0167988 A1* | 8/2004 | Rune | H04L 12/4616 709/238 |
| 2005/0073968 A1* | 4/2005 | Perlman | H04W 88/08 370/315 |
| 2005/0186907 A1* | 8/2005 | Tailor | 455/41.2 |
| 2005/0226198 A1* | 10/2005 | Barak | H04B 7/265 370/345 |
| 2006/0211372 A1* | 9/2006 | Shellhammer | H04W 16/14 455/41.2 |
| 2007/0004466 A1* | 1/2007 | Haartsen | H04W 52/50 455/572 |
| 2007/0060132 A1* | 3/2007 | Wilhelmsson | H04W 52/325 455/445 |
| 2007/0206521 A1* | 9/2007 | Osaje | G01D 4/004 370/315 |
| 2007/0264968 A1* | 11/2007 | Frank et al. | 455/404.2 |
| 2008/0232430 A1* | 9/2008 | Batey et al. | 375/130 |
| 2008/0242229 A1* | 10/2008 | Sharma | H04M 1/05 455/41.3 |
| 2009/0017756 A1* | 1/2009 | Tsfaty | H04L 1/1867 455/41.2 |
| 2010/0061299 A1* | 3/2010 | Kennedy | H04W 40/12 370/328 |
| 2010/0316025 A1* | 12/2010 | Brandt | H04W 72/1215 370/336 |
| 2011/0319022 A1* | 12/2011 | Arad | H04W 4/023 455/41.2 |
| 2012/0315886 A1* | 12/2012 | Lin | H04W 76/02 455/419 |

* cited by examiner

BLUETOOTH NETWORKING

FIELD

The invention relates to the field of wireless networking and, particularly, to implementation of a Bluetooth network.

BACKGROUND

Bluetooth uses a radio technology called frequency-hopping spread spectrum on an unlicensed Industrial, Scientific and Medical (ISM) 2.4 GHz short-range radio frequency band. Bluetooth provides a secure way to connect and exchange information between devices such as faxes, mobile phones, telephones, laptops, personal computers, printers, Global Positioning System (GPS) receivers, digital cameras, and video game consoles. Bluetooth is a communication protocol with a master-slave structure. A master Bluetooth device can communicate with up to seven devices in a Wireless User Group. This network group of up to eight devices is called a piconet. The devices can switch roles, by agreement, and the slave can become the master at any time. The Bluetooth Core Specification allows connecting two or more piconets together to form a scatternet, with some devices acting as a bridge by playing the master role in one piconet and the slave role in another piconet. However, the implementation of such a scatternet is hindered by the fact that the Bluetooth protocol does not allow a device to belong to multiple pico networks simultaneously. As a consequence, the bridge device cannot operate simultaneously in two (or more) piconets, and it has to switch the piconet (and possibly also operation mode between master and slave modes) repeatedly in a time-division manner. This causes high processing overheads in the bridge device, reduces connectivity and throughput between the piconets and causes the bridge device to become a bottleneck in the scatternet.

BRIEF DESCRIPTION

According to an aspect of the present invention, there is provided a communication device comprising: a first Bluetooth transceiver circuitry providing a first Bluetooth connection to a first Bluetooth network; a second Bluetooth transceiver circuitry providing a second Bluetooth connection to a second Bluetooth network different from the first Bluetooth network; an internal connection between the first Bluetooth transceiver circuitry and the second Bluetooth transceiver circuitry to transfer data between the first Bluetooth transceiver circuitry and the second Bluetooth transceiver circuitry; and a processor configured to analyze a destination of a data packet received through any one of the first Bluetooth transceiver circuitry and the second Bluetooth transceiver circuitry and to forward the data packet to the internal connection for further transmission if the data packet is not destined to the communication device or another Bluetooth communication device in the same Bluetooth network as the Bluetooth transceiver circuitry that received the data packet.

According to another aspect of the present invention, there is provided a Bluetooth network comprising: a plurality of communication devices, each communication device comprising communication device comprising a first Bluetooth transceiver circuitry providing a first Bluetooth connection to a first Bluetooth network; a second Bluetooth transceiver circuitry providing a second Bluetooth connection to a second Bluetooth network different from the first Bluetooth network; an internal connection between the first Bluetooth transceiver circuitry and the second Bluetooth transceiver circuitry to transfer data between the first Bluetooth transceiver circuitry and the second Bluetooth transceiver circuitry; and a processor configured to analyze a destination of a data packet received through any one of the first Bluetooth transceiver circuitry and the second Bluetooth transceiver circuitry and to forward the data packet to the internal connection for further transmission if the data packet is not destined to the communication device or another Bluetooth communication device in the same Bluetooth network as the Bluetooth transceiver circuitry that received the data packet, wherein the plurality of communication devices are concatenated to form a network topology comprising a plurality of Bluetooth pico networks, wherein each communication device is connected to at least two Bluetooth pico networks and operates as a bridge device between said two Bluetooth pico networks; and wherein the Bluetooth network comprises at least one client device connected to at least one of the communication devices.

According to another aspect of the present invention, there is provided a method for setting up a Bluetooth network, wherein each communication device comprises at least two Bluetooth transceiver circuitries, the method comprising: disabling a Bluetooth inquiry procedure in all but one of the Bluetooth transceiver circuitries of a first communication device being set up for the operation in the Bluetooth network; configuring the enabled Bluetooth transceiver circuitry of the first communication device to scan for available Bluetooth transceiver circuitries; selecting an available Bluetooth transceiver circuitry and establishing a Bluetooth connection between the enabled Bluetooth transceiver circuitry and the selected Bluetooth transceiver circuitry; determining whether or not another to add another communication device to the Bluetooth network and, in response to determining to add a new communication device to the Bluetooth network, enabling the Bluetooth inquiry procedure in the Bluetooth transceiver circuitry or circuitries being previously disabled; and repeating said disabling, configuring, selecting, and determining for a new communication device to be connected to the first communication device and for any subsequent communication device to be connected to the Bluetooth network.

According to yet another aspect of the present invention, there is provided a computer program product embodied on a distribution medium readable by a computer and comprising program instructions which, when executed by the computer, to carry out a computer process for controlling a Bluetooth communication device comprising at least two Bluetooth transceiver circuitries each providing a connection to a different Bluetooth network and an internal bus between the Bluetooth transceiver circuitries, the computer process comprising: analyzing a destination of a data packet received through any one of the Bluetooth transceiver circuitries; and forwarding the data packet to the internal connection for further transmission to another Bluetooth network if the data packet is not destined to the communication device or another Bluetooth communication device in the same Bluetooth network as the Bluetooth transceiver circuitry that received the data packet.

Embodiments of the invention are defined in the dependent claims.

LIST OF DRAWINGS

Embodiments of the present invention are described below, by way of example only, with reference to the accompanying drawings, in which FIG. 1 illustrates a schematic diagram of a Bluetooth communication device according to an embodiment of the invention;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
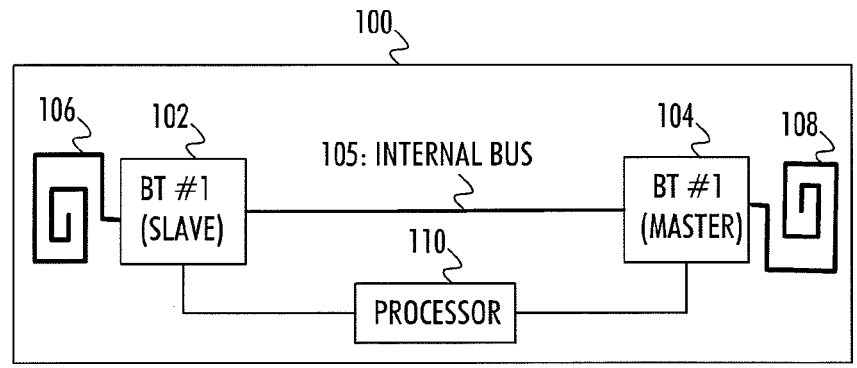

FIG. 1 illustrates a schematic diagram of a Bluetooth communication device 100 according to an embodiment of the invention. The Bluetooth communication device 100 comprises, within the same housing, a first Bluetooth transceiver circuitry 102 providing a first Bluetooth connection to a first Bluetooth network. A first antenna 106 is connected to the first Bluetooth transceiver circuitry 102 to provide the radio communication capability. The communication device 100 further comprises at least a second Bluetooth transceiver circuitry 104 providing a second Bluetooth connection to a second Bluetooth network different from the first Bluetooth network. A second antenna 108 is connected to the second Bluetooth transceiver circuitry 104 to provide the radio communication capability. The distance between the first and the second antenna may be at least 10 cm (preferably at least 15 cm) so as to minimize radio interference between the Bluetooth transceiver circuitries. The Bluetooth communication device 100 further comprises an internal connection 105 between the first Bluetooth transceiver circuitry 102 and the second Bluetooth transceiver circuitry 104 to transfer data between the first Bluetooth transceiver circuitry 102 and the second Bluetooth transceiver circuitry (104). The internal connection 105 may be an internal bus, e.g. universal asynchronous receiver/transmitter (UART) bus. Instead of UART, another type of bus changing data between two processors may be used, e.g. serial port interface (SPI), Universal Serial Bus (USB), and I2C (Inter-Integrated Circuit). In another embodiment, the internal connection 105 is implemented by a shared memory to which both Bluetooth transceiver circuitries have access, and a Bluetooth transceiver circuitry storing data in the shared memory may interrupt the other Bluetooth transceiver circuitry so as to notify it about the data stored in the memory.

The two Bluetooth transceiver circuitries 102, 104 are independent of each other and, thus, they may establish the Bluetooth connections simultaneously and provide the Bluetooth communication device with simultaneous connections to the two Bluetooth networks. The internal bus 105 enables exchange of data between the Bluetooth transceiver circuitries, which effectively enables the Bluetooth communication device to route data between the two Bluetooth networks without disconnecting any one of the Bluetooth connections. Such an arrangement overcomes the problem of switching the bridge device between two piconets. Direct advantages include improved throughput, lower latencies, and less complex architectures for the Bluetooth transceiver circuitries.

In an embodiment, one of the Bluetooth transceiver circuitries operates as a master and the other one of the Bluetooth transceiver circuitries operates as a slave. This arrangement enables concatenation of Bluetooth communication devices to form the scatternet. In the embodiment of FIG. 1, the first transceiver circuitry 102 operates as the slave in its network while the second transceiver circuitry operates as the master in its network.

Figure 4:
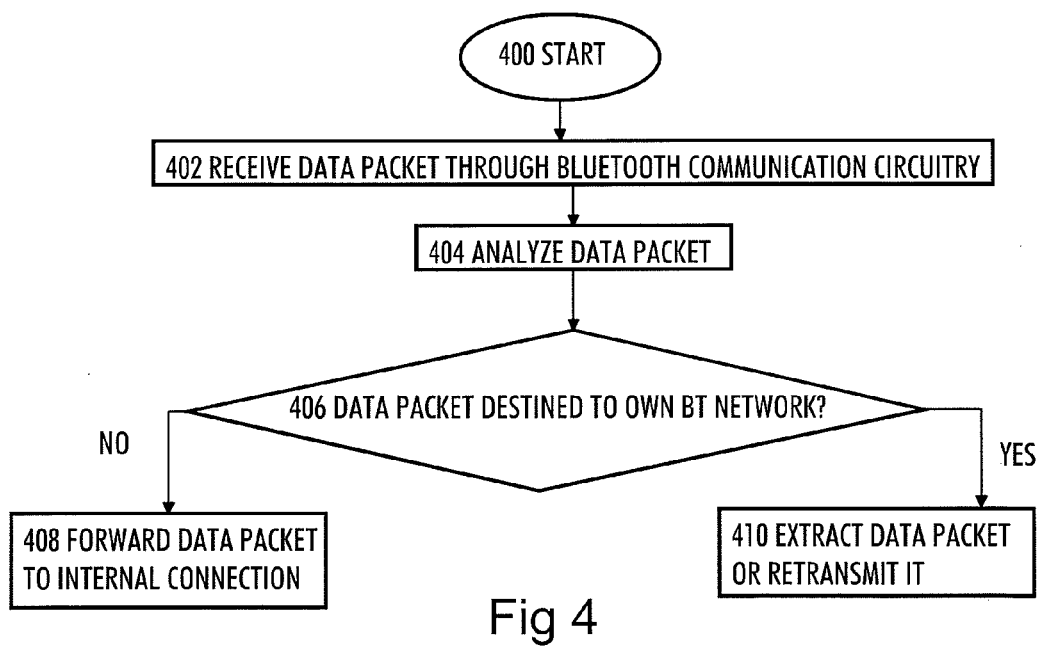
FIG. 4 illustrates a process for controlling the Bluetooth communication device according to an embodiment of the invention.

The Bluetooth communication device further comprises processing means, e.g. a processor 110, arranged to control routing of data packets received from a radio interface in the transceiver circuitries 102, 104. FIG. 4 illustrates a flow diagram of a process for controlling data packet routing in the communication device 100. The process starts in block 400. The processor 110 analyzes in block 404 a destination of a data packet received in block 402 through any one of the first Bluetooth transceiver circuitry 102 and the second Bluetooth transceiver circuitry 104. The processor forwards, in block 408, the data packet to the internal bus 105 for further transmission, if it is determined in block 406 that the data packet is not destined to the communication device or another Bluetooth communication device in the same Bluetooth network as the Bluetooth transceiver circuitry that received the data packet. If the data packet is destined to the communication device, it is extracted in block 410 and the data contained in the data packet is retrieved, or the data packet is retransmitted (block 410) from the same Bluetooth transceiver circuitry that received the data packet. The destination may be determined from a Bluetooth address in a destination field of the data packet. Instead of the Bluetooth address, a unique identifier may be assigned to each bridge node used for both Bluetooth transceiver circuitries in the same device, and the unique identifier may be used for addressing the Bluetooth communication devices. An IP (Internet protocol) is also a possible address that may be used for identifying the Bluetooth communication devices.

With respect to the slave Bluetooth transceiver circuitry 102, the processor 110 analyzes (block 404) a data packet received by the slave Bluetooth transceiver circuitry 102 by checking destination information of the data packet. If the destination information indicates that the destination of the data packet is the communication device 100, the data packet is forwarded to data extraction (block 410) and is extracted in the communication device 100. If the destination information indicates that the destination of the data packet is not the Bluetooth communication device 100, the data packet is forwarded (block 408) to the internal bus for transmission from the master Bluetooth transceiver circuitry 104. With respect to the master Bluetooth transceiver circuitry 104, the processor 110 analyzes (block 404) a data packet received by the master Bluetooth transceiver circuitry 104 by checking destination information of the data packet. If the destination information indicates that the destination of the data packet is the communication device 100, the data packet is forwarded to data extraction (block 410) and is extracted in the communication device 100. If the destination information indicates that the destination of the data packet is not the Bluetooth communication device 100 but is another communication in the Bluetooth network controlled by the master transceiver circuitry, the data packet is retransmitted (block 410) from the master Bluetooth transceiver circuitry to the communication device that is the destination for the data packet. If the destination information indicates that the destination of the data packet is not either the Bluetooth communication device 100 or another communication in the Bluetooth network controlled by the master transceiver circuitry 104, the data packet is forwarded to the internal bus (block 408) for transmission from the slave Bluetooth transceiver circuitry 102.

Upon reception of a data packet from the internal bus 105, the slave transceiver circuitry 102 automatically arranges the transmission of the data packet to a master device in its Bluetooth network. The packet processing may be controlled by the processing means. Upon reception of a data packet from the internal bus 105, the master transceiver circuitry 104 first determines whether the destination address of the data packet matches with any one of the Bluetooth addresses of Bluetooth devices in the Bluetooth network the master transceiver circuitry controls. Upon detection of a match, the master transceiver circuitry arranges the transmission of the data packet to a MAC (Medium Access Control) address of the Bluetooth device which is the destination for the data packet. Upon detection of a match, the master transceiver circuitry arranges the transmission of the data packet to a MAC address of another Bluetooth node which is known to be another bridge device between two Bluetooth piconets in a Bluetooth network topology. The packet processing in both transceiver circuitries may be controlled by the processing means 110.

The functionalities of the processing means 110 may be physically implemented in the respective Bluetooth transceiver circuitries 102, 104, or the processing means may be implemented by an external processor controlling the operation of the transceiver circuitries 102, 104. The processor may be a digital signal processor or a microcontroller configured by computer program products, and the processor may execute a computer program configuring the processor to carry out a computer process comprising computer program modules (blocks 402 to 410) for the above-mentioned functions. The computer program may be in a source code form, object code form, or in an intermediate form, and it may be stored in a carrier, which may be any entity, device, or article of manufacture capable of carrying the program. Such carriers include a record medium, computer memory, read-only memory, electrical carrier signal, telecommunications signal, and software distribution package, for example. Depending on the processing power needed, the computer program may be executed in a single processor or it may be distributed amongst a number of processors. The invention is by no means limited to any specific implementation of the processing means.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. The definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a Bluetooth network device.

Figure 2:
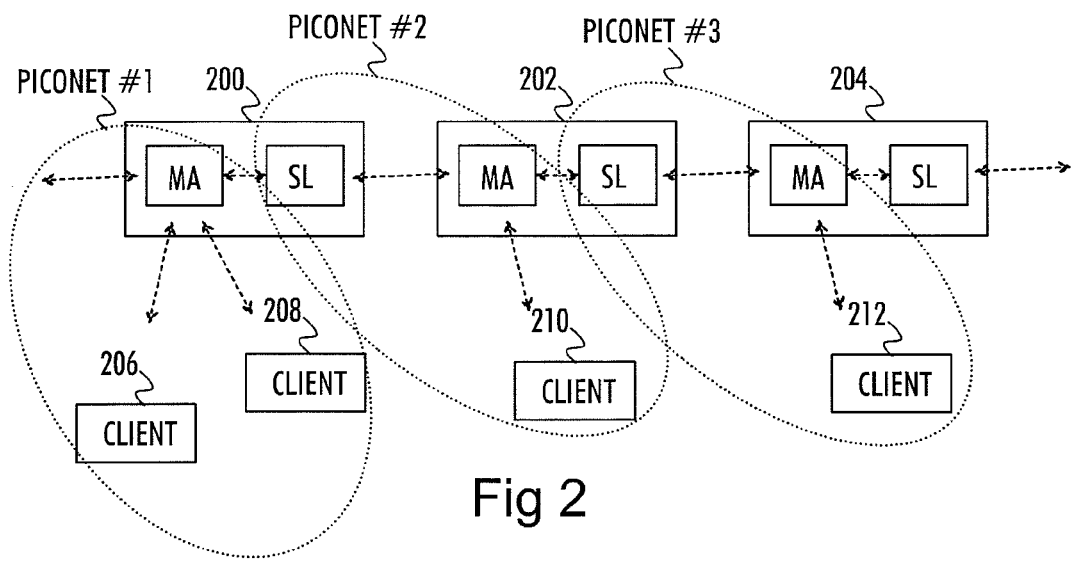
FIG. 2 illustrates a Bluetooth network according to an embodiment of the invention.

FIG. 2 illustrates a structure of a Bluetooth scatternet comprising a plurality of Bluetooth communication devices 200, 202, 204 according to embodiments of the present invention operating as bridge nodes between piconets of the scatternet and client devices communicating over the scatternet. The bridge nodes 200 to 204 may have the structure of the Bluetooth communication device described above in connection with FIG. 1. The Bluetooth network is in this embodiment realized as a pipeline where the bridge nodes are connected to only two other bridge nodes to form the pipeline. The bridge nodes at the ends of the pipeline are naturally connected to only one other bridge node. Moreover, the connections are realized such that a slave transceiver of a given node is connected to a master transceiver of another bridge node, and a master transceiver of the node is connected to a slave transceiver of another bridge node. In this manner, the bridge nodes are concatenated to form the pipeline. Additionally, each master transceiver may be connected up to six other devices as allowed by the Bluetooth protocol. Accordingly, each master transceiver may serve up to six client devices in its piconet. Referring to FIG. 2, a master transceiver of bridge node 202 is connected to a slave transceiver of bridge node 200 and to a client device 210 to form piconet #2. A slave transceiver of bridge node 200 is connected via Bluetooth only to its master transceiver in piconet #2. A master transceiver of bridge node 200 is connected via Bluetooth to a slave transceiver of the next bridge node in the pipeline and to client devices 206, 208 to form piconet #1. The slave transceiver of bridge node 202 is connected to the master transceiver of bridge node 204, and the master transceiver of bridge node 204 is further connected to a client device 212 to form piconet #3. The other bridge nodes in the Bluetooth scatternet are connected in the similar manner to form the pipelined Bluetooth scatternet. The bridge nodes actually form a Bluetooth mesh network as each bridge node operates as a router in the Bluetooth network. An advantage in the pipeline topology is that the bridge nodes to not have to maintain any routing tables. Each master transceiver stores addresses of the Bluetooth devices in its piconet and identifies the Bluetooth device that functions as the bridge to the neighboring piconet in the scatternet topology. If the received data packet is not destined to any Bluetooth device in the piconet, the master transceiver forwards the data packet to the bridge node. The master transceiver does not have to store information on the piconet where the destination Bluetooth device resides, as the data packet will eventually arrive at its destination in the pipeline.

Figure 3A:
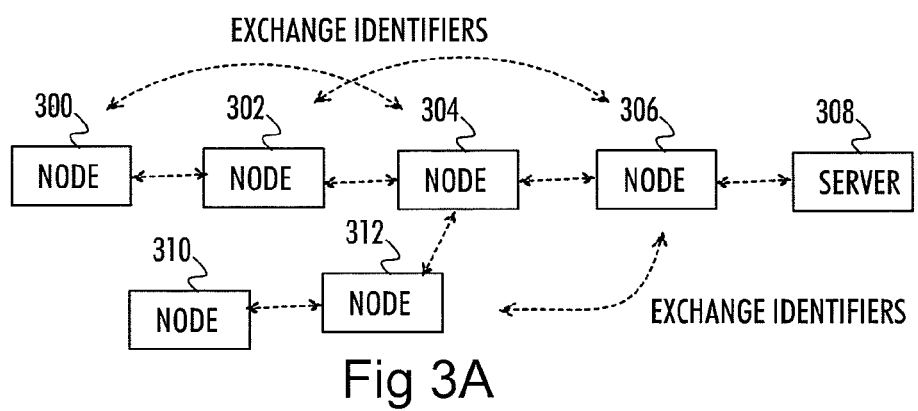
FIGS. 3A and 3B illustrate different Bluetooth network topologies according to embodiments of the invention.
Figure 3B:
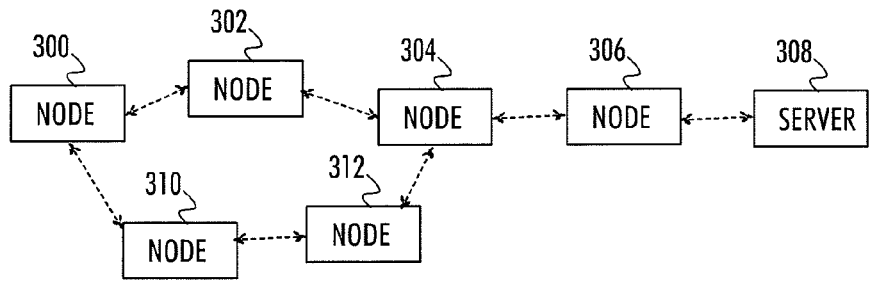

FIGS. 3A and 3B illustrate other embodiments of Bluetooth network topologies. FIG. 3A illustrates a tree topology, and FIG. 3B illustrates a ring topology. Referring to FIG. 3A, the Bluetooth network is connected to a server 308, and the Bluetooth network from the server to bridge node 304 is a pipeline comprising another bridge node 306 between the node 304 and the server 308. The server may be connected to node 306 over a wired connection, or the server may be equipped with Bluetooth communication capability. In node 304, the pipeline branches to two pipelines where nodes 300, 302 form a first branch and nodes 310, 312 form a second branch. The tree topology basically forms a plurality of pipeline branches, wherein bridge nodes at the intersection where a pipeline branches to two (or more) branches are special router nodes storing routing tables. In practice, the master transceiver of the router node utilizes the routing tables. The routing tables may comprise addresses (or other identifiers) of the Bluetooth devices in each branch so that the master transceiver of the router node may transmit data packets to appropriate branches. In more detail, upon reception of a data packet from the direction of the server, the master transceiver of the router node 304 checks the destination address of the data packet and reads the routing table to determine in which branch the destination is located. Then, the master transceiver of the router node forwards the data packet to appropriate node 302, 312 on the basis of the routing information. Instead of routing tables, data flooding may be used where the router node forwards data packets to all branches, except for the branch where the data packet was received.

With respect to FIGS. 3A and 3B, a gateway (not shown) transferring the Bluetooth connection to an IP (Internet protocol) connection may be provided so as to provide the connection between the server 308 and the Bluetooth mesh network. The gateway may change the Bluetooth connection to any other type of connection for routing data between the Bluetooth mesh network and the server.

The Bluetooth network may be provided with self-healing capability. Each bridge node may be configured to store identifiers of the node(s) with which it communicates and, additionally identifier(s) of the bridge node(s) one step further in the network topology. Referring to FIG. 3A, node 300 stores identifiers of nodes 302 and 304, node 302 stores identifier of nodes 300, 304, 306, and 312, node 304 stores identifier of nodes 300, 302, 306, 312, and 310, etc. The bridge node(s) one step further in the network topology are used as auxiliary bridge node(s) for use in case the current connection with the current bridge node fails and cannot be restored. Then, the bridge node detecting the failed connection establishes a connection with an auxiliary bridge node. Moreover, each auxiliary bridge node may be assigned as an auxiliary node to a determined bridge node with which the current connection is established. With respect to node 304, node 300 is an auxiliary node for node 302, and node 310 is an auxiliary node for node 312. The self-healing capability may naturally be adapted to any network topology. In another embodiment, the bridge nodes may periodically transmit a query message to those neighboring bridge nodes so as to detect whether the neighboring bridge nodes are operational. Upon reception of no response for a determined number of such queries, the inquiring bridge node may transmit a failed connection message to the server and identify the neighboring bridge node which does not respond. The server storing the network topology and/or auxiliary bridge node(s) for each bridge node may then determine an auxiliary bridge node to replace the non-responding bridge node and transmit to the bridge node from which the failed connection message was received a command to establish an auxiliary connection to a bridge node designated in the command. Upon reception of the command the bridge node then establishes the auxiliary connection to the designated bridge node. In yet another embodiment, the server itself sends the query messages to the bridge nodes and, upon reception of no response from a given node, commands the node(s) suffering from the failed connection to establish the auxiliary connection in the above-described manner.

After a power outage in the whole system, the connection between the gateway located at the edge of the Bluetooth mesh network and having an IP connection with the server reassigns a communication port with the server. Then, the server may have a problem in identifying the gateway and the Bluetooth mesh network behind the gateway. For such a case, at least one of the bridge nodes in the Bluetooth mesh network may be configured to transmit its/their identifier(s) to the server in response to a reboot caused by a power outage. The server may then use the identifier(s) of the bridge node to identify the whole Bluetooth mesh network, as the server has stored the identifier as belonging to the specific Bluetooth mesh network.

Referring to FIG. 3B, the network topology of this embodiment includes a pipeline and a ring topology. The pipeline topology extends from the server 308 to node 304 and, from there on, the network topology continues as a ring topology. Nodes 300 to 304 and nodes 310, 312 form the ring which is basically a pipeline where ends of the pipeline are connected to each other. The functionality of the packet forwarding in the ring may be implemented in the same manner as described above with respect to the pipeline. In order to optimize the routing, each bridge node may store a routing table comprising information enabling a master transceiver of a given bridge node to determine to which direction a data packet originating from its piconet should be transmitted to reach the destination with a minimum number of hops. The routing table may comprise identifiers of the Bluetooth devices comprised in the ring scatternet in two categories, where each category corresponds to a direction from the master transceiver using the table. Additionally, the routing table may identify the node that operates as a router node providing a connection to networks outside the ring (node 304 in FIG. 3B). Upon detection that the destination of a data packet is not in the ring, i.e. in the routing table, the master transceiver is arranged to transmit the data packet to the router node 304 via a shortest route. In the simplest form, the routing table may store only the shortest route or the corresponding direction to the router node 304, and transmit all the new the data packets towards the router node 304. If the destination address is in a piconet on the path to the router node, the data packet automatically reaches its destination. If the destination address is not on the path to the router node, the router node storing information on the devices in the ring may forwards the data packet towards the destination in the ring or, if the destination is not within the ring, to outer networks.

The server 308 may be configured to control the operation of the Bluetooth network and packet routing in the Bluetooth network. Each bridge node in the Bluetooth network and, particularly, each master transceiver, may periodically report the identifiers of the client device(s) it currently serves in its piconet. The report may be transmitted to the server as event-based and/or periodic reporting. An event-based reporting means that the master transceiver reports to the server in response to addition or removal of a client to/from its piconet. In another embodiment, the client devices are configured to report to the server a bridge node currently serving the client device. As a consequence, the server maintains a database storing information on a serving bridge node for each client device. The server may also maintain information on the network topology, i.e. information on mutual connections between the bridge nodes. The locations of the bridge nodes may be fixed and stored in the database so the server may also be configured to provide a location tracking system for the client devices.

Figure 5:
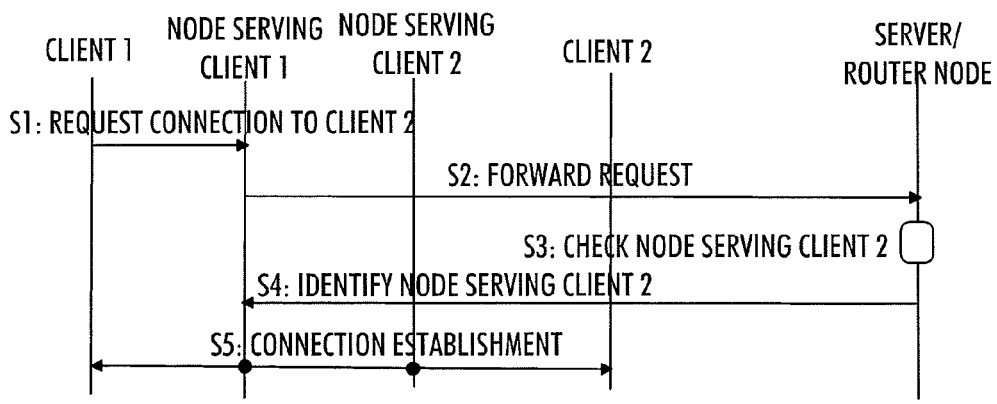
FIG. 5 illustrates establishment of a connection between two client devices of a Bluetooth network according to an embodiment of the invention.
Figure 6:
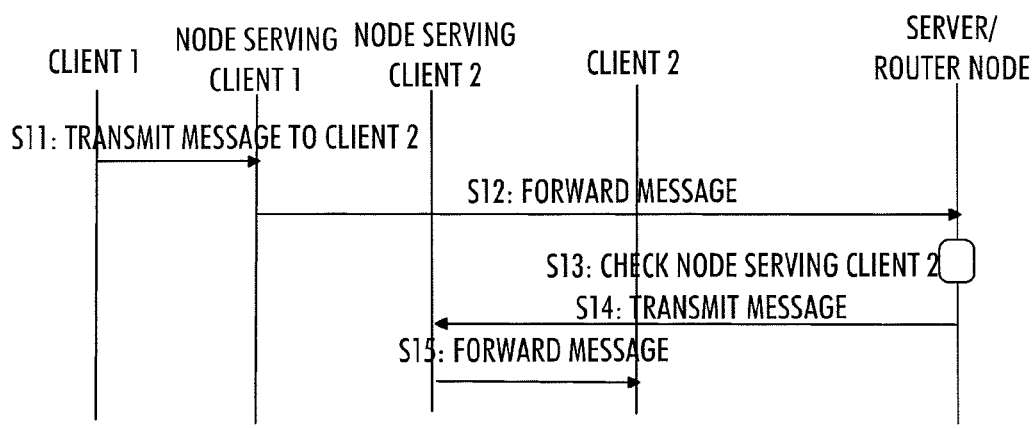
FIG. 6 illustrates message routing in a Bluetooth network according to an embodiment of the invention.

FIGS. 5 and 6 illustrate connection establishment and packet forwarding between client devices in the Bluetooth scatternet according to embodiments of the invention. These embodiments are based on reducing complexity in the bridge nodes, i.e. the bridge nodes need not store information on clients served by other bridge nodes. Each node may, however, store information on the network topology such that each bridge node knows the locations of other bridge nodes or at least the direction where the other bridge nodes reside. Referring to FIG. 5, let us consider establishment of an end-to-end connection between two client devices in the Bluetooth scatternet. The end-to-end connection may be a voice connection or any other bidirectional end-to-end connection. In S1, a client requesting for the establishment of the end-to-end connection (Client 1) transmits a message requesting connection with Client 2 to a master node (master transceiver of a bridge node) of the piconet of Client 1. The master node forwards the request towards the server or router node maintaining routing tables containing information on the bridge nodes currently serving the client devices in the scatternet. In S3, the server or the router node checks the routing tables so as to identify a bridge node currently serving Client 2. Upon determining the bridge node serving Client 2, the server or the router node transmits in S4 a message identifying the bridge node to the bridge node serving Client 1. The Bluetooth address or a device address may be used as an identifier of the node serving Client 2 in the message. Upon reception of the identifier of the node serving Client 2, the node serving Client 1 transmits the request for the establishment of the end-to-end connection to the node serving Client 2 which forwards the request to Client 2. From there on, the connection establishment may follow known Bluetooth end-to-end connection establishment procedures. In another embodiment, the end-to-end connection may be routed through the server, i.e. after step S3 the server establishes a connection with the Client 2 through the node serving the Client 2 and connects the Clients 1 and 2 together, wherein the connection is routed through the server. In this embodiment, the bridge nodes may simply transfer packets of the end-to-end connection between the Client 1 or 2 and the server.

Referring to FIG. 6, let us consider message forwarding in the Bluetooth scatternet according to an embodiment of the invention. In S11, Client 1 transmits a message destined to Client 2. The message is first conveyed to the master node serving Client 1, and the master node forwards the message towards the server or the router node in S12. If Client 2 is located in any piconet along the path to the server or the router node, a master node serving Client 2 and receiving the data packet detects that the message is destined to Client 2 belonging to the piconet of the master node, and it forwards the packet to Client 2, thus completing the message transfer. On the other hand, if Client 2 is not located along the path to the server or the router node, the message is received in the server or the router node. If the network topology is a pipeline, the server or the router node may simply return the data packet along the same path it arrived to the server or the router node in S14. Then, Client 2 resides in a direction from Client 1 other than the direction towards the server or the router node. The message will eventually be received by the node serving Client 2, and the node will then forward the message to Client 2 in S15. If the network topology is a tree topology, the server or the router node may determine a node serving Client 2 in S13 and transmit the message to a corresponding branch in the tree topology in S14.

The server may be configured to carry out network control and coordinate the configuration and operation of the Bluetooth scatternet. As a consequence, the server may transmit control messages to the bridge nodes. The bridge nodes may periodically report their status to the server. The status report may indicate, in addition to the inherent indication of the operational status of the bridge node, a battery status. When the battery status of a given node is below a determined threshold, the server may be configured to alarm an operator in order to indicate that the battery of the node should be replaced. In another embodiment, the server is configured to control nodes connected to the node having low battery status to disconnect and connect to an auxiliary node (see self-healing above) in order to prevent abrupt disconnection in the scatternet. Upon reception of a message commanding establishment of an auxiliary connection, the node being the destination for such a message extracts the message, disconnects from the node indicated in the message, and establishes a connection to one or more auxiliary nodes. Upon establishing the auxiliary connection(s), the node may acquire identifiers of new auxiliary node(s) one step further from the current auxiliary node(s) in the network topology.

Figure 7:
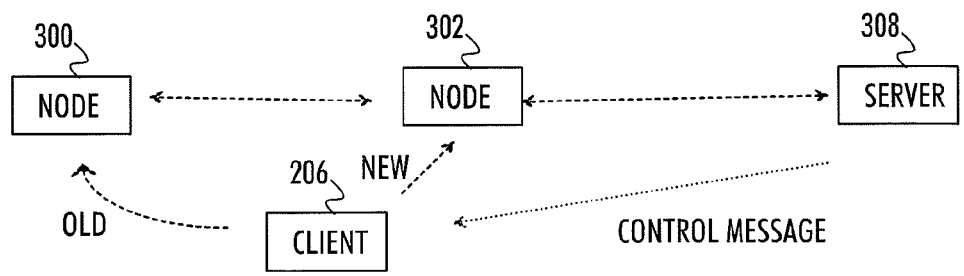
FIG. 7 illustrates handover of a client device according to an embodiment of the invention.

The server may be configured to control traffic balancing in the Bluetooth scatternet by controlling to which piconets the client devices are connected. Upon establishing a connection to one piconet (represented in FIG. 7 by node 300) and optionally transferring a message, a client device 206 may enter a park mode known in the Bluetooth specifications. The client device may be a mobile client device and, thus, require transfer from one piconet to another. In the connection establishment phase, the client device 206 may be configured to operate as a master, while the client device 206 is a slave after the connection has been established. Upon determining a need to transfer another message and, as a consequence, determining to transfer from the piconet of node 300 to another (represented by node 302), the client device may request the transfer from the server 308. The request may comprise identifier of the currently serving bridge node and the bridge node of the new piconet. The nodes may also be configured to transmit a traffic load status in their status report to the server. The server may then be configured to determine the traffic situation in both piconets, and determine whether or not to approve the transfer and transmit an appropriate control message to the client device. For example, if the piconet controlled by node 302 is under a high traffic load, the server may decide to reject the request. On the other hand, if the piconet of node 302 is not under heavy congestion, the transfer may be approved. Upon reception of a control message approving the transfer, the client device initiates Bluetooth connection establishment to the piconet controlled by node 302. Upon reception of a control message rejecting the transfer, the client device 206 remains connected to the old piconet controlled by node 300. The client device may periodically repeat the request until it receives the approval.

Figure 8:
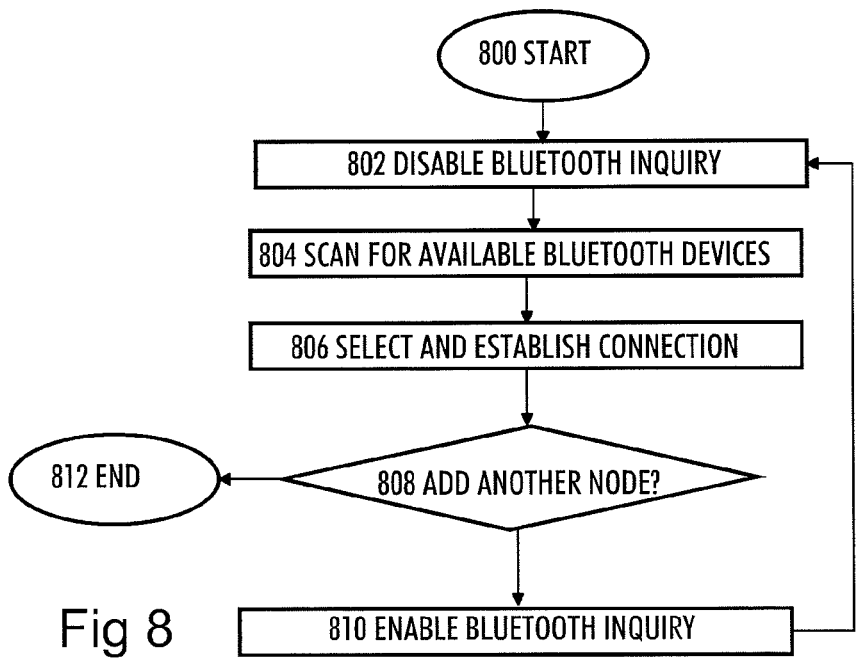
FIG. 8 illustrates a method for setting up a Bluetooth network according to an embodiment of the invention.

FIG. 8 illustrates a method for setting up the Bluetooth network according to embodiments of the invention. The method starts in step 800 from one end point of the Bluetooth network, e.g. the server side. Then, a Bluetooth transceiver is connected to the server (or to the Internet or another network). The Bluetooth transceiver may be configured to operate in a slave mode and activated for Bluetooth inquiry procedure. In steps 802 to 808, a first Bluetooth bridge node is connected to the Bluetooth transceiver to form the first piconet. In step 802, the Bluetooth inquiry procedure is disabled from all but one Bluetooth transceiver circuitry of the first bridge node being set up. The enabled Bluetooth transceiver circuitry may be a master in the connection establishment. In step 804, the (master) Bluetooth transceiver circuitry of the bridge node is configured to scan for available (slave) Bluetooth transceiver circuitries. This causes the master transceiver to detect the above-mentioned Bluetooth transceiver activated for the Bluetooth inquiry. In step 806, the slave Bluetooth transceiver circuitry is selected for connection establishment, and a Bluetooth connection between the master Bluetooth transceiver circuitry and the selected slave Bluetooth transceiver is established. The correct slave Bluetooth transceiver may be identified, for example, from a company identifier part (OUI) of the device address of the slave Bluetooth transceiver. In step 808, it is determined whether or not another bridge node will be added to the network. If it is determined that a new bridge node will be added, the Bluetooth inquiry procedure is enabled in at least one of the other Bluetooth transceiver circuitries of the bridge node that was previously installed in steps 802 to 806. Then, a new bridge node may now be connected to this bridge node in a similar manner. Then, the process returns to step 802, and steps 802 to 808 are repeated for the new bridge node. Similarly, an arbitrary number of bridge nodes may be added to the Bluetooth mesh network by repeating steps 802 to 810. When no more bridge nodes are added to the network, the installation process may be ended in step 812.

Disabling of the other transceivers in step 802 is carried out so that the other transceiver circuitries of the same bridge node will not be detected in the connection establishment and will not cause a connection loop between the (at least) two Bluetooth transceivers the same bridge node. In this embodiment, the roles of the transceivers may be to be connected to each other may be arbitrary in the sense that a new master may be connected to a slave of a previously installed bridge node or vice versa. In another embodiment, the Bluetooth transceiver circuitries in the same communication device may be utilized to execute interleaved inquiry procedure in connection establishment so as to reduce a search time needed to establish the connection. In practice, both (all) Bluetooth transceiver circuitries are arranged to carry out the inquiry procedure simultaneously in step 804, and each Bluetooth transceiver circuitry has a different frequency hopping pattern so that the frequency hopping patterns are interleaved. This increases the probability of finding the active slave Bluetooth transceiver to which the connection is to be established in proportion to the number of interleaved transceiver circuitries carrying out the search in step 804. Both (all) transceiver circuitries of the bridge node being added to the network may be configured to operate as masters or slaves in the inquiry procedure and connection establishment. Upon detection of the available Bluetooth transceiver of another bridge node, any one of the Bluetooth transceiver circuitries of the bridge node being set up may be configured to establish the connection to the available Bluetooth transceiver. The Bluetooth transceiver circuitry establishing the connection will also assume the role of a master or a slave depending on the role of the Bluetooth transceiver with which the connection is established. The other Bluetooth transceiver circuitry of the bridge node being set up will then assume the reverse role. In this embodiment, step 802 may be omitted.

In an embodiment, upon the connection has been established in step 806, the newly added bridge node is configured to transmit to the server a message indicating successful creation of the Bluetooth connection and its identifier (a unique identifier, a Bluetooth device identifier, or another identifier, as mentioned above). As a consequence, when the all the bridge nodes have been added to the mesh network, the server knows the bridge nodes that are included in the scatternet. In order to enable the server to determine the network topology and interconnections between the bridge nodes in the scatternet, the server may transmit a topology configuration message to the bridge node that was the last one added to the network (from which the server received the identifier last). The transmission of the topology configuration message may be triggered when a determined (preconfigured in the server) number of bridge nodes have been added to the scatternet. Upon reception of the topology configuration message, the bridge node being the destination for the message is configured to create a topology configuration response message, add its identifier in the payload portion of the topology configuration response message, and transmit the topology configuration response message to the server. Any node receiving the topology configuration response message on the path to the server is configured to add its identifier to the payload portion in an orderly manner such that the neighboring bridge nodes have their identifiers in the neighboring fields in the payload portion and that the identifiers of the bridge nodes are so concatenated to the topology configuration response message in the same order as they are located in the network topology. At least some of the nodes receiving the topology configuration response message are also configured to extract from the topology configuration response message the identifiers of the nodes that are already listed in the topology configuration response message and, optionally, information on the order in which they are located in the network topology. In other words, each node may determine the network topology from the node towards the source of the topology configuration response message from the topology configuration response message. The nodes may use this information on the network topology in routing tables used in message routing according embodiments of FIGS. 5 and 6, for example.

The server receiving the topology configuration response message containing identifiers of all the nodes in the network topology in the orderly manner may then determine the interconnections between the bridge nodes from the order in which the identifiers are included in the topology configuration response message. In the pipeline topology, this approach is straightforward. In the tree topology, a bridge node in the junction of two branches copies the topology configuration message, optionally changes the destination address to correspond to the bridge node at the end of each brand, and transmits the two separate topology configuration messages to the different branches. The same procedure applies when the number of branches is higher than two. When receiving the topology configuration response messages from the different branches, the bridge node at the junction adds its identifier to both topology configuration response messages in the above-described manner. In the ring topology, a bridge node providing an access out of the ring may be configured to operate as the junction bridge node in the tree topology but transmit the same topology configuration message to both directions in the ring. A bridge node receiving the topology configuration message from two directions transmits two topology configuration response messages to the different directions so that all the bridge nodes in the ring will be included in one of the two topology configuration response messages. The junction bridge node then adds its identifier to both topology configuration response messages and forwards them towards the server.

The present invention is applicable to Bluetooth networks where the bridge nodes form an infrastructure for the Bluetooth scatternet. The protocols used, the specifications of Bluetooth networks, and their network elements and client devices, develop rapidly. Such development may require extra changes to the described embodiments. Therefore, all words and expressions should be interpreted broadly and they are intended to illustrate, not to restrict, the embodiments. While the described embodiments relate to Bluetooth network, the invention is equally applicable to other wireless networks where similar problems of the prior art are present, e.g. a problem that a given device is allowed belong to only one network at a time and it has to switch between multiple networks in order to route data between said networks. It will be obvious to a person skilled in the art that, as technology advances, the inventive concept can be implemented in various ways. The invention and its embodiments are not limited to the examples described above but may vary within the scope of the claims.

The invention claimed is:

1. A communication device comprising:
a master transceiver circuitry configured to operate as a master device in a first network operating according to Bluetooth communication protocol and to connect simultaneously to a plurality of slave devices of the first network;
a slave transceiver circuitry configured to operate as a slave device in a second network operating according to the Bluetooth communication protocol, the second network different from the first network, and to connect to a master device of the second network;
an internal connection between the master transceiver circuitry and the slave transceiver circuitry to transfer data between the master transceiver circuitry and the slave transceiver circuitry; and
a processor configured to control routing of data packets in the communication device,
to analyze, from a destination address field, a destination of a data packet received through any one of the master transceiver circuitry and the slave transceiver circuitry and to forward the data packet to the internal connection for further transmission,
without extracting data of the data packet, if the destination address field does not include an address of the communication device or another Bluetooth communication device in a same network as the transceiver circuitry that received the data packet and
to cause extraction of the data of the data packet in the communication device, if the address of the communication device was included in the destination address field of the data packet,
wherein said processor is further arranged to configure the master transceiver circuitry to employ a frequency hopping pattern that is different from a frequency hopping pattern employed by the second transceiver circuitry in connection establishment so as to reduce a search time needed to establish the connection.

2. The device of claim 1, wherein said processor is further arranged to determine, from the destination address field, for a data packet received through the slave transceiver circuitry whether or not the final destination of the data packet is the communication device, route the data packet not destined to the communication device to the internal connection for transmission from the master transceiver circuitry, and forward the data packet for data extraction, if the data packet is destined to the communication device.

3. The device of claim 1, wherein said processor is further arranged to determine for the data packet received through the master transceiver circuitry whether or not the final destination of the data packet is the communication device or another device in a network controlled by the master transceiver circuitry, route the data packet not destined to the communication device or any other device in the network controlled by the master transceiver circuitry to the internal connection for transmission from the slave transceiver circuitry, forward the data packet for data extraction, if the data packet is destined to the communication device, and control the master transceiver circuitry to transmit the data packet to a device in the Bluetooth network controlled by the master transceiver circuitry, if the data packet is destined to the device in the network.

4. The device of claim 1, wherein the communication device is simultaneously connected to both first and second network, wherein the communication device operates as a bridge between the first and second network, wherein each transceiver circuitry is connected to another bridge between two networks, and wherein each transceiver circuitry is configured with self-healing capability by storing an identifier of an auxiliary bridge device for use in case a current connection with the other bridge fails and by configuring the transceiver circuitry to connect to the auxiliary bridge device upon said failed connection.

5. A wireless network comprising:
a plurality of communication devices, each of the plurality of communication devices comprising a master transceiver circuitry configured to operate as a master device in one network operating according to Bluetooth communication protocol and to connect simultaneously to a plurality of slave devices of the one network;
a slave transceiver circuitry configured to operate as a slave device in another network different from the one network and operating according to the Bluetooth communication protocol, and to connect to a master device in said another network;
an internal connection between the master transceiver circuitry and the slave transceiver circuitry to transfer data between the master transceiver circuitry and the slave transceiver circuitry; and
a processor configured to control routing of data packets in the communication device, to analyze, from a destination address field, a destination of a data packet received through any one of the master transceiver circuitry and the slave transceiver circuitry and to forward, without extracting data of the data packet, the data packet to the internal connection for further transmission if the destination address field of the data packet does not include an address of to the communication device or another communication device in a same network as the transceiver circuitry that received the data packet, and to cause extraction of data of the data packet in the wireless communication device, if the destination address field of the data packet includes the address of the communication device,
wherein the plurality of communication devices are concatenated to form a network topology comprising a plurality of pico networks, wherein each communication device is connected to at least two pico networks and operates as a bridge device between said two pico networks; and
wherein the wireless network comprises at least one client device connected to at least one of the communication devices,
wherein said processor is further arranged to configure the master transceiver circuitry to employ a frequency hopping pattern that is different from a frequency hopping pattern employed by the second transceiver circuitry in connection establishment so as to reduce a search time needed to establish the connection.

6. The wireless network of claim 5, wherein the network topology comprises a pipeline topology where the plurality of communication devices are concatenated such that a master transceiver circuitry of a given communication device is connected to a slave transceiver circuitry of a neighboring communication device in the pipeline topology, and a slave transceiver circuitry of said communication device is connected to a master transceiver circuitry of another neighboring communication device in the pipeline topology, with the exception that communication device at the end of the pipeline is connected to only one other communication device in the pipeline topology.

7. The wireless network of claim 5, wherein the network topology comprises a plurality of pipeline topologies in a plurality of branches, wherein a master transceiver circuitry at an intersection of at least two pipeline branches operates as a router node and is arranged to store information on communication devices in each pipeline branch for routing purposes.

8. The wireless network of claim 5, wherein the network topology comprises a ring topology, wherein a master transceiver circuitry of each communication device, serving a client device in its pico network, is configured to forward data packets received from the client device to a certain direction in the ring topology.

9. The wireless network of claim 5, wherein the network is connected to a server configured to monitor the network topology by monitoring how the communication devices are connected to each other in the wireless network, to monitor the location of the client devices by receiving from the communication devices information on client devices currently connected to each communication device, and to provide the at least one client device with data transfer services by using the monitored location of the client devices.

10. The wireless network of claim 5, wherein said client device operates in a slave mode and is connected to a master transceiver circuitry of a communication device in the wireless network.

11. The wireless network of claim 5, wherein the network is connected to a server configured to monitor the network, and wherein at least one of the plurality of communication devices is configured to report to the server identifiers of client devices currently served in a pico network in which said at least one of the plurality of communication devices operates as a master.

12. The wireless network of claim 5, wherein the network is connected to a server configured to control traffic balancing by controlling to which pico network said at least one client device is connected.

13. The wireless network of claim 5, wherein the network is connected to a server configured to monitor the network, and wherein said plurality of communication devices is configured to transmit a status report to the server, the status report comprising at least one of a traffic load status and a battery status.

14. The wireless network of claim 13, wherein the status report comprises at least the battery status, and wherein at least one of the plurality of communication devices is configured to receive from the server an instruction to disconnect from another one of the plurality of communication devices and to establish an auxiliary connection to yet another one of the plurality of communication devices.

15. The wireless network of claim 5, further comprising a server connected to the wireless network and configured to monitor the wireless network, and further comprising at least one bridge node configured to transmit, in response to a reboot caused by a power outage, an identifier of the at least one bridge node to the server, wherein the server is configured to identify the wireless network on the basis of the identifier of the at least one bridge node after the power outage.

16. A non-transitory computer readable recording medium having recorded thereon a program which, when executed carries out a process for controlling routing of data packets in a communication device, the process comprising:

analyzing, from a destination address field, a destination of a data packet received through any one of a master transceiver circuitry and a slave transceiver circuitry, wherein the master transceiver circuitry is configured to operate as a master device in a first network operating according to a Bluetooth communication protocol and to connect simultaneously to a plurality of slave devices of the first network, and the slave transceiver circuitry is configured to operate as a slave device in a second network different from the first network and operating according to the Bluetooth communication protocol, and to connect to a master device of the second network, and an internal bus between the master and slave transceiver circuitries; and forwarding, without extracting data of the data packet, the data packet to the internal connection for further transmission to another Bluetooth network if the destination address field of the data packet does not include an address of the communication device the communication device or another communication device in a same network as the transceiver circuitry that received the data packet and causing extraction of data of the data packet in the wireless communication device if the destination address field of the data packet includes an address of the communication device, configuring the master transceiver circuitry to employ a frequency hopping pattern that is different from a frequency hopping pattern employed by the second transceiver circuitry in connection establishment so as to reduce a search time needed to establish the connection.

\* \* \* \* \*